(12) United States Patent
Selberg

(10) Patent No.: US 7,660,791 B2
(45) Date of Patent: Feb. 9, 2010

(54) SYSTEM AND METHOD FOR DETERMINING INITIAL RELEVANCE OF A DOCUMENT WITH RESPECT TO A GIVEN CATEGORY

(75) Inventor: Erik W. Selberg, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 710 days.

(21) Appl. No.: 11/066,297

(22) Filed: Feb. 28, 2005

(65) Prior Publication Data

US 2006/0195439 A1  Aug. 31, 2006

(51) Int. Cl.
G06F 7/00 (2006.01)
G06F 17/30 (2006.01)
G06F 17/00 (2006.01)

(52) U.S. Cl. ............................. 707/5; 707/10; 707/100

(58) Field of Classification Search ........................ None
See application file for complete search history.

(56) References Cited

U.S. PATENT DOCUMENTS

| | | | |
|---|---|---|---|
| 6,999,974 B2* | 2/2006 | Dockter et al. | 707/104.1 |
| 2002/0174095 A1* | 11/2002 | Lulich et al. | 707/1 |
| 2003/0033333 A1* | 2/2003 | Nishino et al. | 707/531 |
| 2005/0256887 A1* | 11/2005 | Eiron et al. | 707/100 |
| 2005/0265239 A1* | 12/2005 | Previdi et al. | 370/238 |

* cited by examiner

Primary Examiner—Charles Rones
Assistant Examiner—Alicia M Lewis
(74) Attorney, Agent, or Firm—Shook, Hardy & Bacon, LLP

(57) ABSTRACT

A system and method are provided for determining document relevance determination to a selected category for a document contained within a linked network of documents. The network may be represented by a network map including nodes representing documents and edges representing links between the documents. The method may include identifying each node in the network map known to belong to the selected category, identifying each node known to be outside of the selected category, and identifying nodes having an unknown category. The method may also include assigning a category rank based on the node category identification, identifying each link from each node and each link to each node, and assigning link weights based on the identified links. The method may additionally include determining node relevance to the selected category based on the assigned category rank and the assigned link weights. An origination domain and a destination domain for each link may be determined such that link weights are assigned for both incoming and outgoing links for each node.

17 Claims, 7 Drawing Sheets

| CATEGORY RELEVANCE DETERMINATION COMPONENTS 300 ||
|---|---|
| CATEGORY DETERMINATION COMPONENT 310 | INITIAL WEIGHT ASSIGNMENT COMPONENT 320 |
| DOMAIN DETERMINATION COMPONENT 330 | LINK LOCATOR 340 |
| WEIGHT DETERMINATION COMPONENT 350 | INDEXING COMPONENT 360 |

FIG. 3

SYSTEM AND METHOD FOR DETERMINING INITIAL RELEVANCE OF A DOCUMENT WITH RESPECT TO A GIVEN CATEGORY

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for determining relevance and in particular to a system and method for determining relevance of linked documents or other information sources with respect to a given category.

BACKGROUND OF THE INVENTION

In recent years, computer search systems have become heavily utilized and various search systems compete to provide relevant and rapid results. Since user satisfaction depends upon both speed and relevance, search system developers strive to improve search system speed and performance.

Currently, search engines formulate an estimate of a document's relevance to any arbitrary query. Search engines strive to show relevant documents and eliminate irrelevant documents. The ordering of documents by relevance in a searchable index improves the performance of the search system. With currently implemented search systems, when implementing a searchable index, the search engine assumes that documents beyond a certain point will become less relevant.

One known relevance determination technique for determining the relevance of an information source involves counting the number of links or citations contained within the information source. This technique may be useful in a network containing relatively uniform types of information sources. In such a uniform system, it may be reasonable to assume that an information source often cited by other information sources is of greater relevance than a less frequently cited information source.

This technique may be implemented by incorporating all information sources in a network in a graph. If the graph represents information sources, such as documents on the world wide web, a node may be provided to represent each document and an edge may represent each hyperlink between two documents. Initially, every node may be assigned an equal weight. Based on how many links connect one node to another, weights shifts. After multiple iterations, shifting of weights will be complete and prior relevance of a node can be determined. When an edge points to a node having no outlinks, its weight will be re-distributed back into system of linked documents as a whole by a junk vector or reset vector. The default junk vector may assign a weight equal to (1/number of sources in the system) to each node.

The above-identified algorithm does not consider document content in its relevance determination. Accordingly, in the context of the World Wide Web, due to such factors as spam and web page proliferation, the algorithm has become less effective. Web page proliferation has included a large increase in category specific pages. Accordingly, in order to improve on results and to consider the proliferation of category specific web pages, a system has been developed that pre-seeds category specific pages before running the page rank algorithm. For instance, the system might initially rank some page categories, for example sports, news, or politics, higher than other pages and subsequently execute the above-identified algorithm. This system can find prior rank of given document based on category.

A problem with these existing solutions is their purely forward-looking nature. Existing solutions move forward and consider outgoing links from a node, but do not look backwards in the linked network or consider incoming links. Furthermore, existing solutions fail to take advantage of known information in order to categorize documents. For example, existing solutions fail to consider whether links move from one domain to another. Furthermore, existing solutions fail to filter out undesirable items belonging to pre-selected categories, such as for example pornography and hate information sources. Thus, a solution is needed for determining initial relevance of a document with respect to a given category while considering contextual information such as category and domain.

BRIEF SUMMARY OF THE INVENTION

Embodiments of the present invention include a method for providing a document relevance determination to a selected category for a document contained within a linked network of documents. The network may be represented by a network map including nodes representing documents and edges representing links between the documents. The method may include identifying each node in the network map known to belong to the selected category, identifying each node known to be outside of the selected category, and identifying nodes having an unknown category. The method may additionally include assigning a category rank based on the node category identification and identifying each link from each node and each link to each node. The method may further include assigning link weights based on the identified links and determining node relevance to the selected category based on the assigned category rank and the assigned link weights.

In a further aspect, a method may be provided for weighting links between documents in a linked network of documents in order to arrive at a document relevance determination to a selected category for a selected document contained within the linked network of documents. The method may include determining a domain of the selected document and identifying each link from the selected document to any linked destination document and determining a destination domain of each linked destination document. The method may additionally include identifying each link to the selected document from any linked origination document and determining an origination domain of each linked origination document. The method may further include weighting each identified link based on whether the destination domain and the origination domain are the same as the domain of the selected document.

In a further aspect, a system may provide a document relevance determination to a selected category for a document contained within a linked network of documents. The network represented by a network map including nodes representing documents and edges representing links between the documents. The system may include a category determination component for identifying each node in the network map known to belong to the selected category, identifying each node known to be outside of the selected category, and identifying nodes having an unknown category. The system may additionally include an initial weight assignment component for assigning a category rank based on the node category identification and a link locator for identifying each link from each node and each link to each node and assigning link weights based on the identified links. The system may additionally include a relevance determination component for determining node relevance to the selected category based on the assigned category rank and the assigned link weights.

BRIEF DESCRIPTION OF THE DRAWINGS

The present invention is described in detail below with reference to the attached drawings figures, wherein:

FIG. 3 is a block diagram illustrating relevance determination components in accordance with an embodiment of the invention;

DETAILED DESCRIPTION OF THE INVENTION

I. System Overview

Figure 1:
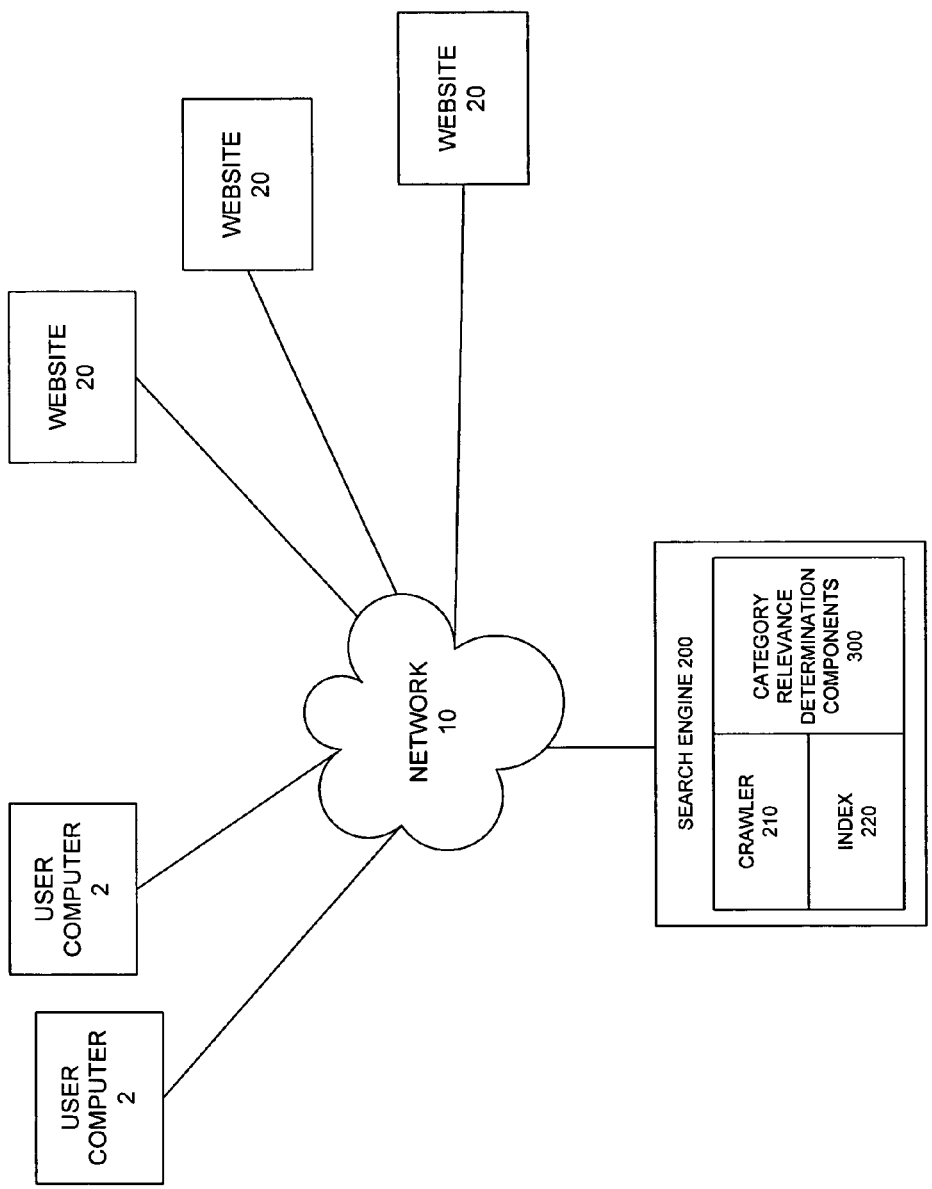
FIG. 1 is a block diagram illustrating an overview of a system in accordance with an embodiment of the invention.

Embodiments of the invention provide a method and system for determining relevance of a document or other information source within a linked network. FIG. 1 illustrates a system including multiple user computers 2 connected over a network 20 to a search engine 200 and multiple websites 20. The search engine 200 may include a crawler 210, an index 220, and category relevance determination components 300. Although FIG. 1 illustrates an embodiment of the invention for use with the World Wide Web, it may be possible to implement the invention in other network environments that provide access to linked information sources.

In operation, the crawler 210 traverses the linked information sources such as the websites 20 connected over the network 10 and indexes the traversed websites 20 in the index 220. The category relevance determination components 300 may also operate in order to determine the relevance of documents to a particular category and store related information in the index 220 or in another location.

As will be further explained below, the category relevance determination components 300 may determine relevance based on categories of information sources. The category relevance determination components 300 may further determine relevance based on the domains and categories of incoming and outgoing links.

II. Exemplary Operating Environment

Figure 2:
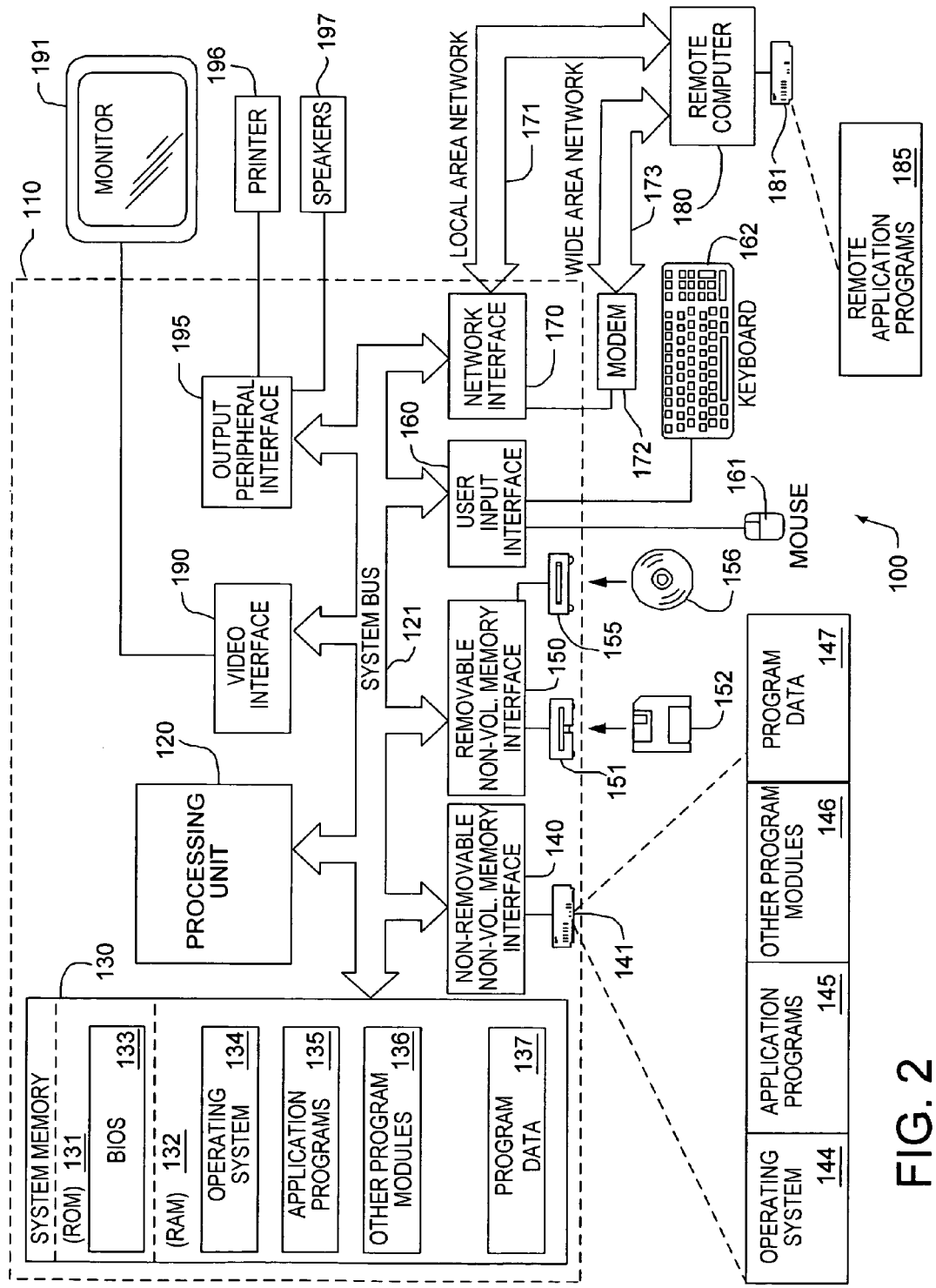
FIG. 2 is block diagram illustrating a computerized environment in which embodiments of the invention may be implemented.

FIG. 2 illustrates an example of a suitable computing system environment 100 on which the system for determining relevance may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for determining relevance of linked information sources. The system may include multiple user computers 2 connected over the network 20 to the search engine 200 and multiple information sources 20. The search engine 200 may include a crawler 210, an index 220, and category relevance determination components 300. In embodiments of the invention, the information sources 20 may be websites and the network 10 may be the Internet.

FIG. 3 illustrates details of the category relevance determination components 300. The category relevance determination components 300 main include a category determination component 310, an initial weight assignment component 320, a domain determination component 330, a link locator 340, a domain link weight assignment component 350, and a relevance determination component 360.

The category determination component 310 may determine a category for each node or information source. Categories on the World Wide Web may include sports, news, shopping, opinion, and other often sought categories. Some categories, such as spam, phishing, pornography, and hate may be viewed as undesirable. Phishing sites will generally have the appearance of a legitimate site, but are designed to persuade users to divulge personal information. Typically, any advertising site may be viewed as spam. Overlap may exist between these undesirable types of sites. Because these categories may be viewed as undesirable, nodes in these categories may be viewed as undesirable and thus may be lumped together in a single category and removed from the index 220 if desired.

A network of identified nodes, such as web pages, may be represented by a graph G=(E, V), where V is a set of vertices or nodes in the graph and E is a set of edges (V1, V2) that connects the vertex V1 to the Vertex V2. In the context of the World Wide Web, V may represent a set of web pages and E may represent a set of hyperlinks from one web page to another. E' may be used to represent links in the opposite direction of E. For instance, E' may be a set of all edges (V2. V1), such that if (V1, V2) is in E, then (V2, V1) is in E'. In a graph with a total number of N nodes, the category determination component 310 may find a set of nodes "A" that are known to be in a given category and a set of nodes "B" that are not contained within the given category.

Figure 5:
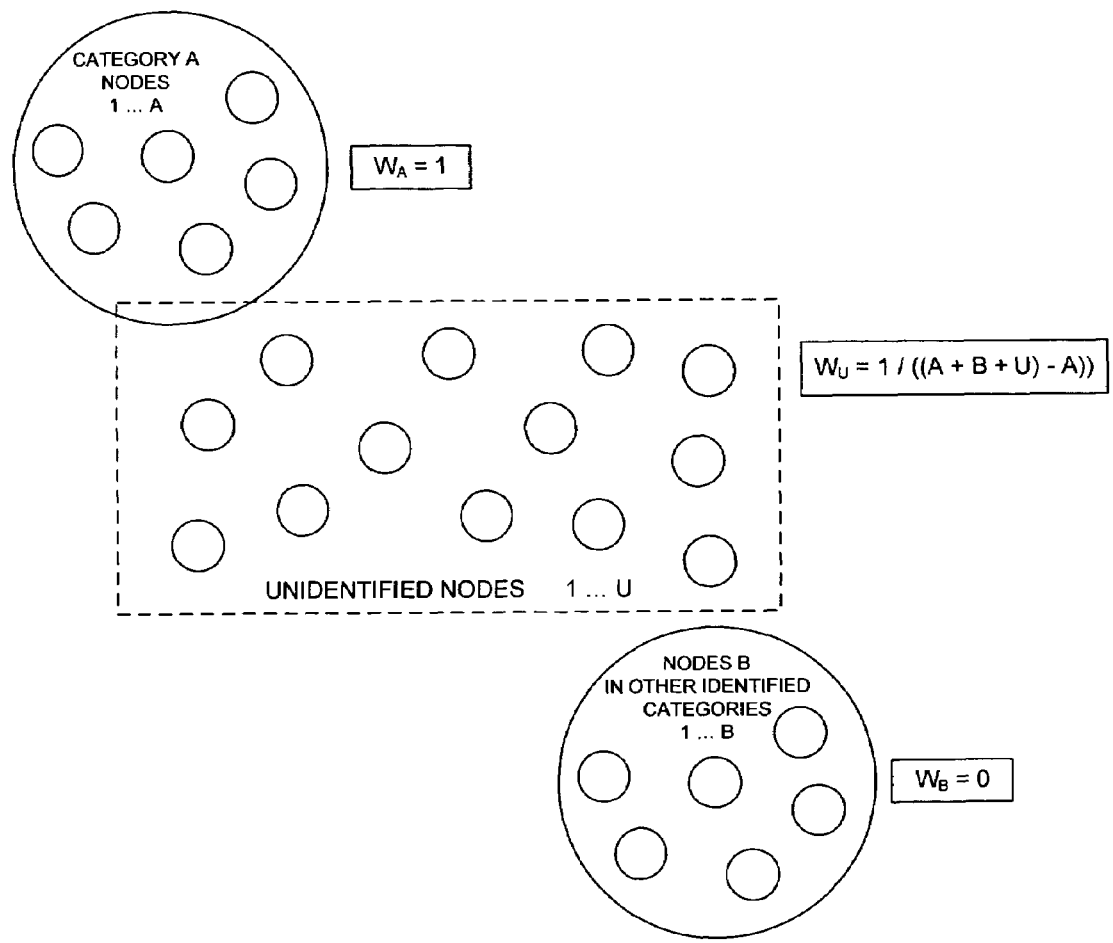
FIG. 5 is a diagram illustrating weight assignment based on category in accordance with an embodiment of the invention.

After category determination, the initial weight assignment component 320 may assign initial relevance weights. The initial weight assignment components may set the initial weight for all of the nodes in the set "A" equal to 1, and the weight for all of the nodes in the set "B" equal to 0. The initial weight assignment component 320 may set the relevance values for the remaining nodes to be 1/(N−size of A). Category determination and initial weight assignment are further illustrated in FIG. 5. The nodes in category A are identified as nodes 1 through A and are assigned a weight $W_A=1$. Nodes in other identified categories are designated as nodes 1 through B and are assigned a weight of $W_B=0$. Nodes belonging to unidentified categories are designated as nodes 1 through U and are assigned a weight of $W_U=(1/(A+B+U)-A))$, which is equal to the inverse of the total number of available nodes that are not in the identified category A.

Thus, the initial weight assignment component 320 assigns basic category ranks. The weight assignment components may also assign a vector component for each category and thus a vector category rank. Thus if a node is a news node, it would have components 1, 0, 0, the news category being "1" and any other categories being 0. The unidentified nodes in category U will likely have a vector component involving a lesser percentage, such as 0.5, 0.2, or other probability.

Figure 6:
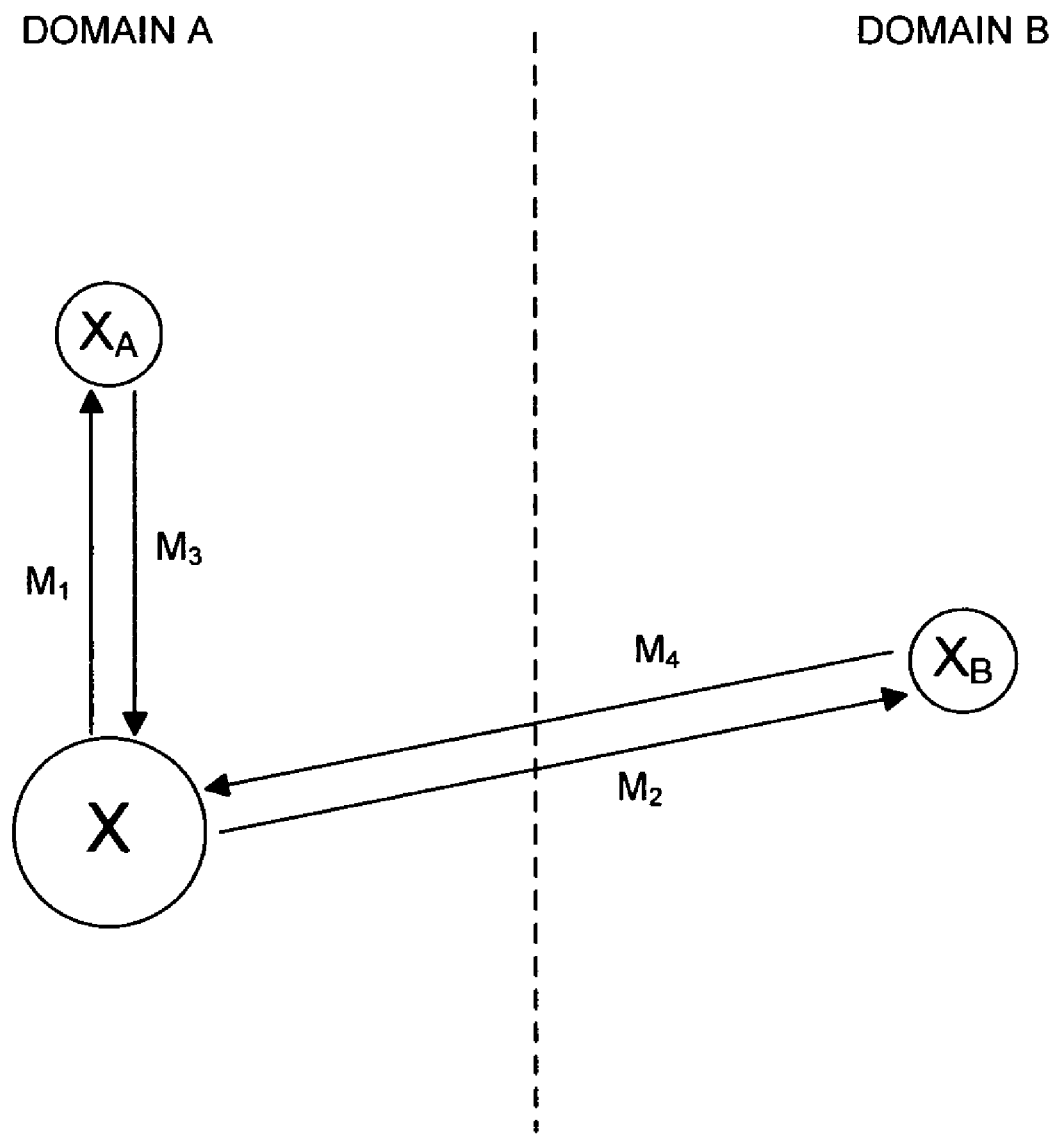
FIG. 6 is a mapping diagram illustrating weight assignment based on domain in accordance with an alternative embodiment of the invention.

The domain determination component 330 determines whether each link accesses a domain that is the same as its origination domain or different from its origination domain. Using this information, the domain determination component 330 may assign a vector domain category rank. As illustrated in FIG. 6, an origination domain may be designated as Domain A. The domain A may include a plurality of nodes, such as node X and node $X_A$. The domain B may also include multiple nodes. For simplicity, Domain B is shown as containing one node $X_B$.

Each link from the node X in domain A that connects with a node in the same domain A may be assigned a value $M_1$. Each link from the node X that access a node $X_B$ in the different domain B may be assigned a value $M_2$. Each link accessing the node X from the within same domain A, such as from the node $X_A$ may be assigned the value $M_3$. Each link accessing the node X from outside of the domain A, for example from the node $X_B$ within the domain B, may be assigned a value $M_4$. The values $M_1$, $M_2$, $M_3$, and $M_4$ are four real valued non-negative numbers having a total sum of one.

As an example, the node X might be the web page www.cnn.com. The link given the value $M_1$, might point to the www.cnn.com/foo. The link given the value $M_2$ might access the node www.microsoft.com. The numbers $M_1$ and $M_2$ correspond to the percentage of weight given to links based upon the domain.

Although category ranks may initially be determined at a "page" level, these determinations may be collapsed to a domain level. Domains can be heavily clustered around a particular category. Based on the categories in a domain, the category relevance determination components 300 can build a vector of weights, where each element in the vector corresponds to the weight in a given category.

For instance, three nodes at www.ms.com might point to an IBM node. The IBM node may in turn point to an MSN node. With this scenario, the category relevance determination components 300 may collapse the three www.ms.com nodes into one super node. With the procedures described above, the category relevance determination components 300 may produce an initial vector model of how likely the page is to be in a given category. The category relevance determination components 300 can combine vectors linearly (v1+v2+v3)/n to provide a linear weighting of an entire domain. Accordingly, if a domain is primarily concerned with "hate" topics, the combined vector will be mostly about hate. However, if the domain includes random categories, the vector will be more complicated. The vector sum allows creation of a domain map such that instead of performing calculations each time a new web page is created, the calculation can be done on the order of domains. Furthermore, a domain may be collapsed into one weight. If nodes from the MSN domain point to the IBM domain 5% of the time and to the MSN domain the other 95%, then the link is 0.95. These numbers from each domain dampen the effect depending upon how strenuous the connection is from one domain to another.

Some categories typically link heavily to themselves. For instance, a hate node has a given likelihood, e.g. 0.9, that an outgoing link to the same domain is hate and 0.95 that an incoming link from the same domain is in the same category. If the links are across domains, the incoming probability may be 0.7 and the outgoing may be 0.8. Accordingly, the link domain weight assignment component 350 considers a node and calculates the likelihood that incoming and outgoing links point to the same category. Instead of looking purely forward as in previous systems, the category relevance determination components 300 operate in both directions.

The relevance determination component 360 then undertakes a number of iterations in which each node pushes a percentage of its weight to all nodes that it points to and to all nodes that point to it until the overall change is below a certain pre-set threshold value. The web crawler 210 may implement an indexing component to index the resultant determination. This relevance determination process may be accomplished by use of the formula:

$$\text{Weight of } v\_y = \text{weight of } v\_y + (1/\text{links}\_i * \text{weight of } v\_i * m\_Y) \quad (1)$$

Thus, according to formula (1), the weight of a node v_y is determined by an iterative process in which the weight of v_y is repeatedly inserted into the right side of the equation until its change in value is below a pre-selected threshold value.

In formula (1), v_i and v_y represent nodes. Links_i represents the number of links in and out of the node v_i. In order to define Y, nodes v_j that v_i points to, where v_i and v_j are in the same domain may be designated as "toin_i". The set of nodes v_j that v_i points to when v_i and v_j are in different domains may be designated as "tout_i". The set of nodes v_j that point to v_i when v_j and v_i are in the same domain may be designated as "fromin_i". The set of nodes v_j that point to v_i when v_i and v_j are in different domains may be designated as "fromout_i".

The formula above is applied to each set Y, where $$Y = \{\text{toin\_i}, \text{tout\_i}, \text{fromin\_i}, \text{fromout\_i}\} \quad (2)$$

where v_y is a node in the set Y.

In formula (1), "m_Y" is equal to the percentage of weight given to links to nodes in the set Y as described above with regard to the real-valued non-negative numbers M1, M2, M3, and M4.

Figure 4:
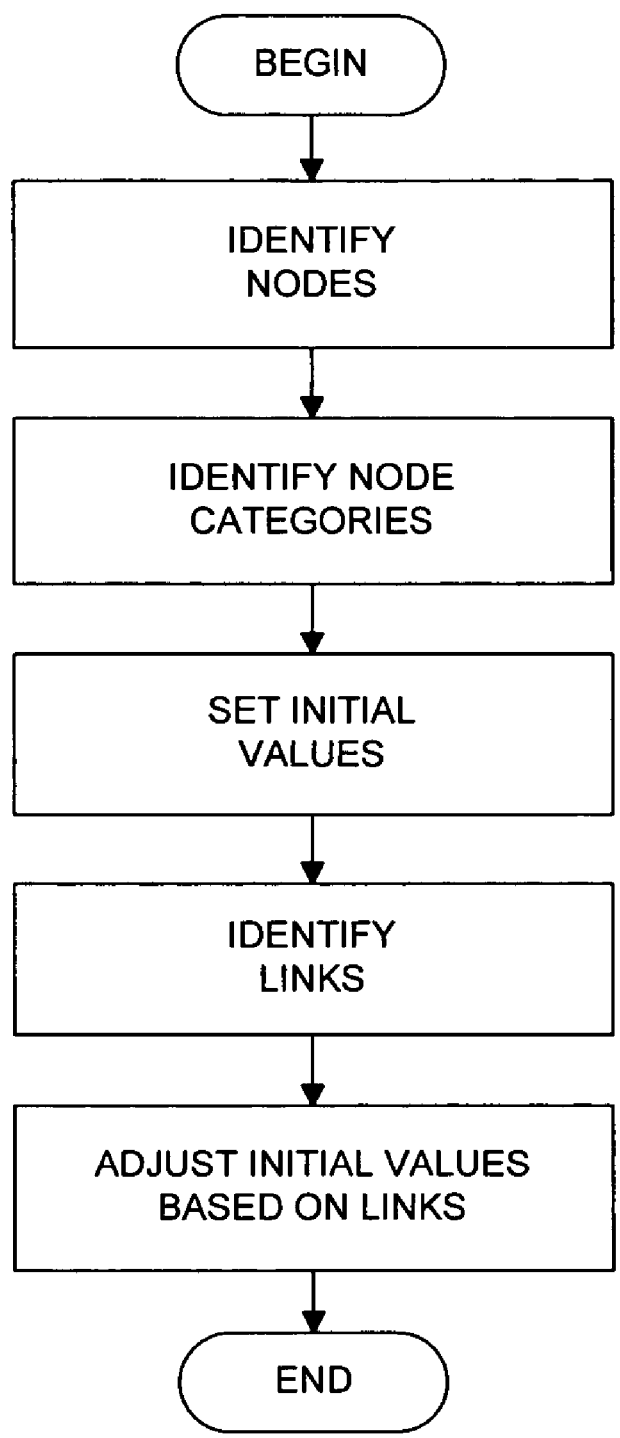
FIG. 4 is a flow chart illustrating a method for determining initial relevance in accordance with an embodiment of the invention.

FIG. 4 is a flow chart illustrating a method for determining relevance in accordance with an embodiment of the invention. At regular intervals, for example, once a week, the relevance determination components traverse a network map, calculate values, and store the values. Ultimately, upon receiving a user query, the system identifies a query category and based on the query category determines which pages should be ranked higher and which should be ranked lower.

With regard to FIG. 4, the process begins in step 400. In step 410, the category relevance determination components 300 may identify nodes and in step 420 the category determination component 310 may identify corresponding node categories. Based on the node categories determined in step 420, the initial weight assignment component 320 may set initial values or category rank in step 430. In step 440, the link locator 340 may identify links and relate the links to a domain and the domain determination component 330 may determine origination and destination domains. In step 450, the domain link weight assignment component may assign link weights based on domain. In step 460, the relevance determination components 360 adjust the values based on the links as set forth above with relation to the description of formula (1). The process ends in step 470.

Figure 7:
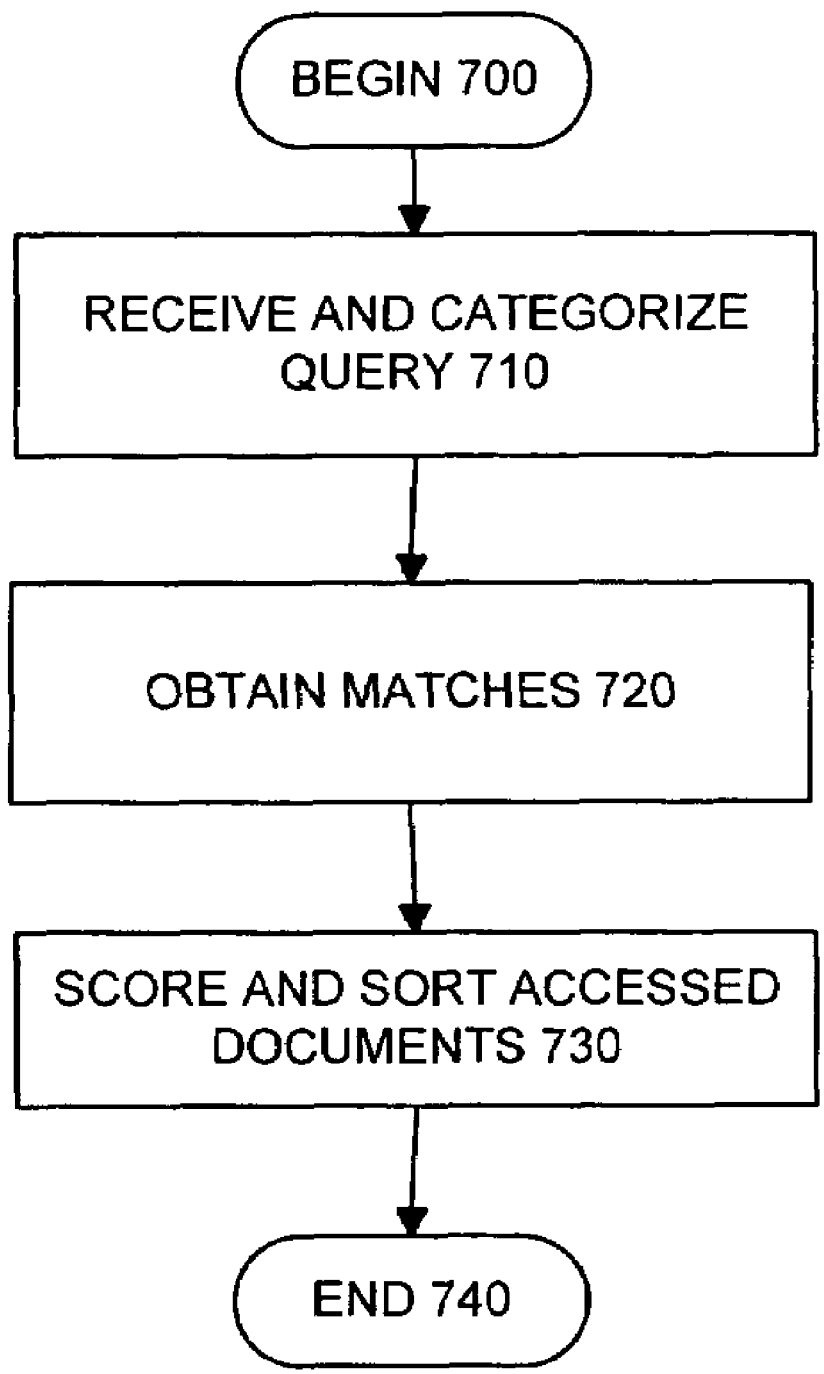
FIG. 7 is flow chart illustrating a method for query processing in accordance with an embodiment of the invention.

FIG. 7 illustrates a method for responding to a user query in accordance with an embodiment of the invention. In operation, when the search engine 200 receives an input query in step 700, it will categorize the query in step 710. Categorization is typically accomplished by looking up query terms in a dictionary. Next, in step 720, the search engine 200 will obtain matches by consulting the index 220. The index 220 may allow the search engine 200 to access documents that match query terms without respective categories as well as initial filtering based on negative categories. Finally, in step 730, the search engine 200 will score and sort the accessed documents using preferred categories and prior relevance based on category as determined by the steps set forth above with relation to FIG. 4. The process ends in step 740.

The scoring and sorting processes described above with respect to FIGS. 4 and 7 improve upon previous solutions by considering additional factors in order to perform ranking. Relevance scoring incorporating of any one or more of these additional factors may be within the scope of embodiments of the invention. For instance, as described above, algorithms incorporated in the system of the invention, may consider types of links, such as links going to an off-domain page and links going to an in-domain page. The following formula defines a Link Class Segment $LC_i$ as:

$$LC_i = \{\forall (u,v) : (u,v) \in E \char`\^ (u,v) \text{ is of type } i\} \quad 3)$$

Each class is mutually exclusive and each node (u, v) must be in one and only one class segment. A dampening factor $df_i$ of a class link segment may be defined as a number from zero to one. A link class dampening function, lcd, may be defined as:

$$lcd(u,v) = df_i : (u,v) \in LC_i \quad 4)$$

Dampening factor values may be determined empirically. For example, the link class may correspond to "links within the same domain". With one thousand samples of nodes (u, v), 780 may be positive examples of some type of node, and the remaining 220 may be negative examples. In this case, the dampening factor may be defined as 780/1000 or 0.78.

To perform ranking, a segmented link rank function may be defined as follows:

$$SLR(v) = \frac{d}{|V|} + (1-d) \sum_{(u,v) \in E} \frac{lcd(u,v) SLR(u)}{O(u)} \quad 5)$$

In addition to types of links, the system of the invention may incorporate a bi-directional link class algorithm. In this instance, the system considers not only the rank mass being pushed to a given node, but also the existing mass being propagated back from a node. The system may initially mark some nodes as negative or positive examples of a given class and then back-propagate their values. For example, if I(w) is an in-link degree of node w, set I(w)=; such that: w, e.g.: $I(w) = |\{\forall v_i : (v_i, w) \in E\}|$ $$BiSLR(v) = \frac{d}{|V|} + (1-d) \left( \sum_{(u,v) \in E} \frac{lcd(u,v) BiSLR(u)}{O(u)} + \sum_{(v,w) \in E} \frac{lcd(v,w) BiSLR(w)}{I(w)} \right) \quad 6)$$

In a further embodiment, as described above, the system may implement a vector-based bi-directional link class rank algorithm. Whereas the algorithms introduced above assume a singular value, the following algorithm computes a vector of values that reference aspects of a node. For example, a value might correspond to a "sports" relatedness, a "news" relatedness, or a "spam" relatedness of a node.

If the vector has a length n, a vector based version of link class and dampening factor may be provided:

$$LC_{i,j} = \{\forall (u,v) : (u,v) \in E \char`\^ (u,v) \text{ is of type } i\} \quad 7)$$

A vector version of lcd, vec_lcd may be:

$$vec\_lcd(u,v) = \lfloor df_{i,1}, df_{i,2}, \ldots, df_{i,n} \rfloor \quad 8)$$

Accordingly, the BiSLR function of equation (5) may be modified as follows:

$$VecBiSLR(v) = \frac{d}{|V|} \bar{1} + (1-d) \left( \sum_{(u,v) \in E} \frac{vec\_lcd(u,v) VecBiSLR(u)}{O(u)} + \sum_{(v,w) \in E} \frac{vec\_lcd(v,w) VecBiSLRR(w)}{I(w)} \right) \quad 9)$$

In this equation, 1 corresponds to a vector of 1s of length n.

Finally, the above algorithm may be optimized by changing to a domain map as follows:

$domain_i \subseteq V$ $DV = \{d_1, d_2, \ldots\}$ is a set of vertices such that $d_i$ corresponds to $domain_i$;

dom(u) is a function that returns the domain $d_i$ such that $u \in domain_i$;

$DE = \{(u, v) : u, v \in DV \char`\^ (\exists (u', v') : (u', v') \in E \char`\^ dom(u) \neq dom(v))\}$ is a set of edges connecting domains; and DG=(DV, DE) is a graph comprised of a set of edges and a set of vertices.

Accordingly, VecBiSLR as defined in equation (8) or any other variation of this equation may be used with elements from DG as well as elements from G.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer-storage media with computer-executable instructions embodied thereon for executing a method for providing a document relevance determination to a selected category for a document contained within a linked network of documents, the network represented by a network map including nodes representing documents and edges representing links between the documents, the method comprising:

identifying each node in the network map known to belong to the selected category, identifying each node known to be outside of the selected category, and identifying nodes having an unknown category;

assigning a category rank based on the node category identification, wherein each node known to belong to the selected category receives a weight of 1, each node having an unknown category receives a weight that is the inverse of the total number of documents having an unknown category and documents known to be outside the selected category, and each node known to be outside of the selected category receives a weight of 0;

identifying each link from each node and each link to each node;

assigning link weights based on the identified links; and determining node relevance to the selected category based on the assigned category rank and the assigned link weights.

2. The media of claim 1, further comprising identifying an origination domain and a destination domain for each link.

3. The media of claim 2, further comprising assigning link weights based on whether the origination domain is the same as the destination domain.

4. The media of claim 3, further comprising assigning link weights for both incoming and outgoing links for each node.

5. The media of claim 3, further comprising determining node relevance to the selected category based on the assigned category rank and domain-based link weights.

6. The media of claim 4, further comprising assigning link weights for each node such that the sum of the incoming link weights and outgoing link weights is equal to one.

7. The media of claim 3, further comprising collapsing multiple nodes within an identified domain into a single node.

8. One or more computer-storage media with computer-executable instructions embodied thereon for executing a method for weighting links between documents in a linked network of documents, the method comprising:

determining a domain of the selected document;

identifying each link from the selected document to any linked destination document and determining a destination domain of each linked destination document;

identifying each link to the selected document from any linked origination document and determining an origination domain of each linked origination document;

identifying each document in the network known to belong to the selected category, identifying each document known to be outside of the selected category, and identifying documents having an unknown category;

weighting each identified link based on whether the destination domain and the origination domain are the same as the domain of the selected document, thereby arriving at a document relevance determination to a selected category for a selected document contained within the linked network of documents;

assigning a category rank to each document based on the category identification, wherein each document known to belong to the selected category receives a weight of 1, each document having an unknown category receives a weight of 1 divided by the total number of documents having an unknown category and documents known to be outside the selected category, and each document known to be outside of the selected category receives a weight of 0; and determining document relevance to the selected category based on the assigned category rank and the assigned link weights.

9. The media of claim 8, further comprising assigning link weights for both incoming and outgoing links for each document.

10. The media of claim 9, further comprising determining document relevance to the selected category based on the assigned category rank and domain-based link weights.

11. The media of claim 8, further comprising assigning link weights associated with each document such that the sum of the incoming link weights and outgoing link weights is equal to one.

12. The media of claim 8, further comprising collapsing multiple documents within an identified domain into a single document.

13. A system for providing a document relevance determination to a selected category for a document contained within a linked network of documents, wherein the system is implemented utilizing a processor that executes instructions from a computer-storage medium, the network represented by a network map including nodes representing documents and edges representing links between the documents, the system comprising:

a category determination component for identifying each node in the network map known to belong to the selected category, identifying each node known to be outside of the selected category, and identifying nodes having an unknown category;

an initial weight assignment component for assigning a category rank based on the node category identification, wherein each node known to belong to the selected category receives a weight of 1, each node having an unknown category receives a weight of 1 divided by the total number of documents having an unknown category and documents known to be outside the selected category, and each node known to be outside of the selected category receives a weight of 0, and wherein further the three components can be scaled by a scaling factor;

a link locator for identifying each link from each node and each link to each node and assigning link weights based on the identified links; and a relevance determination component for determining node relevance to the selected category based on the assigned category rank and the assigned link weights.

14. The system of claim 13, further comprising a domain determination component for identifying an origination domain and a destination domain for each link.

15. The system of claim 14, further comprising a domain weight assignment component for assigning link weights based on whether the origination domain is the same as the destination domain.

16. The system of claim 15, wherein the domain weight assignment component assigns link weights for both incoming and outgoing links for each node.

17. The system of claim 15, wherein the node relevance determination component determines node relevance to the selected category based on the assigned category rank and domain-based link weights.

* * * * *

UNITED STATES PATENT AND TRADEMARK OFFICE
CERTIFICATE OF CORRECTION

PATENT NO. : 7,660,791 B2
APPLICATION NO. : 11/066297
DATED : February 9, 2010
INVENTOR(S) : Erik W. Selberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1381 days.

Signed and Sealed this

Thirtieth Day of November, 2010

David J. Kappos
*Director of the United States Patent and Trademark Office*